(12) United States Patent
Lou

(10) Patent No.: US 9,625,050 B2
(45) Date of Patent: Apr. 18, 2017

(54) ENGINE VALVE ACTUATION SYSTEM

(71) Applicant: Zheng Lou, Plymouth, MI (US)

(72) Inventor: Zheng Lou, Plymouth, MI (US)

(73) Assignee: NINGBO HOYEA MACHINERY MANUFACTURE CO., LTD., Ningbo (CN)

(*) Notice: Subject to any disclaimer, the term of this patent is extended or adjusted under 35 U.S.C. 154(b) by 67 days.

(21) Appl. No.: 14/604,757

(22) Filed: Jan. 26, 2015

(65) Prior Publication Data

US 2016/0215661 A1    Jul. 28, 2016

(51) Int. Cl.
| | |
|---|---|
| F01L 9/02 | (2006.01) |
| F16K 31/122 | (2006.01) |
| F01L 1/18 | (2006.01) |
| F02M 47/02 | (2006.01) |
| F01L 1/08 | (2006.01) |
| F01L 1/26 | (2006.01) |
| F01L 1/047 | (2006.01) |
| F02D 13/02 | (2006.01) |
| F02D 13/04 | (2006.01) |

(52) U.S. Cl.
CPC .......... F16K 31/1221 (2013.01); F01L 1/181 (2013.01); F01L 9/025 (2013.01); *F01L 1/08* (2013.01); *F01L 1/267* (2013.01); *F01L 9/02* (2013.01); *F01L 2001/0476* (2013.01); *F01L 2105/00* (2013.01); *F01L 2800/00* (2013.01); *F01L 2800/01* (2013.01); *F01L 2820/03* (2013.01); *F02D 13/0207* (2013.01); *F02D 13/04* (2013.01); *F02M 47/027* (2013.01); *F16K 31/122* (2013.01)

(58) Field of Classification Search
CPC .............. F01L 9/02; F01L 9/021; F01L 9/023
USPC .... 123/90.12, 90.16; 251/57, 62, 63.4, 63.5, 251/63.6
See application file for complete search history.

(56) References Cited

U.S. PATENT DOCUMENTS

| | | | | |
|---|---|---|---|---|
| 2,329,662 | A * | 9/1943 | Steiner .................... | F01L 9/021 123/90.12 |
| 2,595,775 | A * | 5/1952 | De Wrangell .......... | F01L 1/042 123/90.12 |
| 3,120,221 | A * | 2/1964 | Lyons ..................... | F01L 1/465 123/90.12 |
| 4,244,553 | A * | 1/1981 | Escobosa ................ | F01L 9/021 123/90.12 |
| 4,671,221 | A * | 6/1987 | Geringer .................. | F01L 1/25 123/198 F |
| 4,674,451 | A * | 6/1987 | Rembold ................. | F01L 9/025 123/198 F |
| 4,957,075 | A * | 9/1990 | Hasegawa ........... | F01L 13/0015 123/90.12 |

(Continued)

*Primary Examiner* — R. K. Arundale

(57) ABSTRACT

An engine valve actuation system comprises a camshaft, with at least one cam; a control shaft one; a control shaft two; and at least one valve actuation unit, each valve actuation unit further comprising: (i) at least one set of an engine valve and an engine-valve return spring; (ii) an lost-motion module, further comprising a collapsible high-pressure chamber, and operably converting the profile of at least one cam and the collapsing motion from the high-pressure chamber to corresponding movement of the at least one engine valve; and (iii) a hydraulic circuit, further comprising a trigger valve one and a trigger valve two, the two trigger valve being controlled respectively by the control shaft one and the control shaft two.

17 Claims, 10 Drawing Sheets

(56) References Cited

U.S. PATENT DOCUMENTS

| | | | | |
|---|---|---|---|---|
| 5,193,494 A | * | 3/1993 | Sono | F01L 1/16 123/90.12 |
| 2008/0251041 A1 | * | 10/2008 | Lou | F01L 9/02 123/90.12 |
| 2010/0192881 A1 | * | 8/2010 | Padroni | F01L 9/025 123/90.15 |

* cited by examiner

ENGINE VALVE ACTUATION SYSTEM

FIELD OF THE INVENTION

This invention relates generally to engine valve actuators and corresponding methods and, in particular, to actuators utilizing lost-motion mechanism with accurate and robust timing control.

BACKGROUND OF THE INVENTION

Various systems can be used to actively control the timing and lift of engine valves to achieve improvements in engine performance, fuel economy, emissions and other characteristics. One class of systems, called lost-motion system, has been disclosed in U.S. Pat. Nos. 4,671,221, 5,193,494, 5,839,400, 6,053,136, 6,553,950, 6,918,364, 6,981,476, 7,819,100, 8,578,901, 8,820,276 and 8,776,738. Each of the above lost-motion systems invariably comprises a cam, a master piston, a high pressure chamber, a mechanism to drive an engine valve, an on/off or 2-way solenoid valve as a release valve or trigger valve, an engine valve and an engine-valve return spring. Most of these systems, as disclosed in U.S. Pat. Nos. 4,671,221, 5,193,494, 5,839,400, 6,053,136, 6,553,950, 6,918,364, 6,981,476, 7,819,100, and 8,578,901 further includes at least one slave piston, which is separated from the master piston by a volume or column of fluid in the high pressure chamber and is operably connected the engine valve. A second slave piston may also be added to drive a second engine valve. The cam drives the engine valve, in the opening direction, through an optional tappet, the master piston, high pressure chamber and the slave piston. The engine-valve return spring returns the engine valve in the closing direction. The cam profile normally defines the valve displacement or lift profile or lift. The solenoid valve is typically a normally-open valve and has to be switched to the closed state for the high pressure chamber to maintain a high pressure and transfer the cam lobe into the engine valve displacement. When the solenoid valve is not closed early enough, the engine valve will be opened late and lose some of the total available valve movement or motion. When the solenoid valve is opened before the end of the cam lobe, a fast bleeding of the fluid from the high pressure chamber will cause the engine valve to collapse and close early, losing some motion or lift.

Other systems, disclosed in U.S. Pat. Nos. 4,8,820,276 and 8,776,738, further comprises a mechanical motion transfer system, which further includes a rocker arm, a pivoting axle, a push rod, a level pushrod, and a pivoting bridge. The cam drives the engine valve operably through the mechanical motion transfer system and with the master piston as an adjustable reference point or foundation. With the master piston at its fully extended position, the engine valve realizes its full lift profile. When the solenoid valve either closes too late or open too early, the engine valve will lose some of the potential motion.

When a control signal 19 is issued as shown in FIG. 1, the actual plunger or spool displacement 20 of a solenoid valve does not following the signal exactly. The control signal 19 in FIG. 1 is idealized for easy presentation, and the actual input current to a solenoid has more content or dynamics, for example, a peak-and-hold pattern for faster response and low energy consumption. For a normally-open valve, it is closed effectively and fully when it is energized, with its displacement 20 reaching its closure threshold Xo and the maximum Xmax, respectively. For a valve of a poppet design, a plunger has to be fully seated to have an effective closure, i.e., Xo=Xmax. For a valve of a sliding spool design, an overlap is normally included to reduce leakage, thus Xo<Xmax. The valve achieves an effective closure with a close time delay T1. Under the action of a control-valve return spring, the valve opens up again after the solenoid is off, with an open time delay T2. The time delays T1 and T2 result from solenoid inductance, inertia of the all moving masses, viscous force, hydraulic pressure force, etc. For a typical solenoid valve for a lost-motion system, the solenoid inductance is generally a dominant factor under normal (i.e., warm and hot) temperature conditions. The viscous force plays increasingly a more important role at a colder temperature, even a dominant role under an extremely low temperature. The solenoid inductance is also impacted by the coil temperature. The viscous force also varies with the clearance, wear and dynamic eccentricity between two moving parts. Hydraulic pressure force varies with the system conditions, and more so at low temperatures.

For a typical solenoid valve for a lost-motion system, T1 and T2 are typically around a few milliseconds or shorter depending on the design trade-off, and they are generally required to be short for better control flexibility. At an extremely cold temperature, e.g. under −20 deg C. T1 and T2 may be longer than 10 milliseconds.

For an engine cam system, manufacturers typically require that engine valve profiles have an accuracy within +/−1 crank angle degrees, that is within +/−0.167 ms and +/−0.0556 ms in timing for the engine speed at 2,000 rpm and 6,000 rpm, respectively. Therefore, an accurate control or prediction of time delays T1 and T2 are important. In addition, the closure threshold Xo is in a way only one theoretical or artificial point, the flow restriction is present throughout its vicinity. The shape, i.e. curvature and slope, of the displacement 20 around Xo is also important. It is desirable to consistently control and/or predict the displacement 20.

The lost-motion valve systems, branded as MultiAir and UniAir, are now in production in Fiat and Chrysler vehicles, and their key advantage over variable valve timing system is their ability to control intake air volume without use of a throttle body, thus reducing air pump-loss and achieving 5% or more incremental fuel economy benefits. Application vehicles, however, still use the throttle body for air intake control during engine warm up because of above discussed low-temperature operation challenges. Any improvement dealing with these challenges will also help broaden application of the lost-motion systems to other advanced combustion modes, such as HCCI (homogenous charge compression ignition).

Accordingly, there remains a need for a method and apparatus for accurate and robust control of the trigger valve.

SUMMARY OF THE INVENTION

The present invention is intended to provide a method and apparatus for accurate and robust control of the trigger valves in the lost-motion systems.

Briefly stated, in one aspect of the invention, one preferred embodiment of an engine valve actuation system comprises: a) a camshaft, with a plurality of cams; b) a control shaft one; c) a control shaft two; and d) a plurality of valve actuation units, each unit further comprising: (i) at least one set of an engine valve and an engine-valve return spring; (ii) an lost-motion module, further comprising a collapsible high-pressure chamber, and operably converting the profile of the one of the cams and the collapsing motion from the high-pressure chamber to corresponding movement of the at least one engine valve; and (iii) a hydraulic circuit, further comprising: a passage two, in fluid communication with the high-pressure chamber; a passage one, in fluid communication with an oil supply; a trigger valve one and a trigger valve two, parallelly arranged, each being a two-way valve, each being connected between the passage one and the passage two and thereby controlling fluid communication between the passage one and the passage two, and being controlled respectively by the control shaft one and the control shaft two; and an accumulator, in fluid communication with the passage one.

In one preferred embodiment, the lost-motion module further comprises a master piston, slidably situated in one end of the high-pressure chamber and operably in connection with the one of the cams; and at least one slave piston, slidably situated in another end of the high-pressure chamber and operably in connection with the at least one engine valve.

In another preferred embodiment, the hydraulic circuit further comprises a supply check valve, situated along the passage one, thereby allowing one-way flow from the oil supply.

In one preferred embodiment, each of the trigger valve one and the trigger valve two is of a rotary design.

In another preferred embodiment, the trigger valve one comprises a valve cavity one, with at least one opening to the passage one and at least one opening to the passage two, and accommodating inside the control shaft one; and the trigger valve two comprises a valve cavity two, with at least one opening to the passage one and at least one opening to the passage two, and accommodating inside the control shaft two.

In one preferred embodiment, (a) the trigger valve one further comprises at least one passage-one balance undercut on the wall of the valve cavity one; and at least two flow channels fabricated on the control shaft one; thereby opening once and closing once fluid communication between the passage one and the passage two per revolution by the control shaft one; and (b) the trigger valve two further comprises at least one passage-one balance undercut on the wall of the valve cavity two; at least two flow channels fabricated on the control shaft two; and thereby opening once and closing once fluid communication between the passage one and the passage two per revolution by the control shaft two.

In another preferred embodiment, (a) the trigger valve one further comprises at least one passage-one balance undercut and at least one passage-two balance undercut on the wall of the valve cavity one; and at least two flow channels fabricated on the control shaft one; thereby opening twice and closing twice fluid communication between the passage one and the passage two per revolution by the control shaft one; and (b) the trigger valve two further comprises at least one passage-one balance undercut and at least one passage-two balance undercut on the wall of the valve cavity two; and at least two flow channels fabricated on the control shaft two; thereby opening twice and closing twice fluid communication between the passage one and the passage two per revolution by the control shaft two.

In one preferred embodiment, each of the trigger valve one and the trigger valve two is of a linear design; the control shaft one comprises a plurality of control lobes; and the control shaft two comprises a plurality of control lobes.

In another preferred embodiment, each of the trigger valve one and the trigger valve two comprises a reset spring, thereby resetting open the fluid communication; the trigger valve one is forced to close when actuated by one of the control lobes on the control shaft one; and the trigger valve two is forced to close when actuated by one of the control lobes on the control shaft two.

In one preferred embodiment, the lost-motion module further comprises: an adjustable piston, slidably situated in one end of the high-pressure chamber; and a motion mechanism, operably connecting the adjustable piston with the at least one engine valve, whereby reducing the opening motion of the at least one engine valve when the oil in the high-pressure chamber is discharged.

The present invention provides significant advantages over other lost-motion engine valve actuation systems. By using two control shafts, actuated by electrical motors, to control all trigger valves used in the lost motion system, there will be better timing consistency because the control features, such as flow channel or earn profiles, on these control shafts will be manufactured in the same precise and efficient manner as a regular camshaft has been manufactured over the years. Also, electrical motors are generally more robust than solenoid valves at cold temperatures, and thus the lost-motion system of this invention can activate its throttle-less operation mode in a much broader temperature range and over a wider range of a drive cycle (especially during an engine warm-up), which is consistent with the new industrial trend to replace electrohydraulic variable valve timing systems with electrical variable valve timing systems. The rotary type of trigger valves of this invention operates under more or less steady state rotation mode, avoiding impact noise from reciprocating linear motion of a solenoid valve. A camshaft-like control shaft is generally robust and reliable. Robust and accurate control may also improve overall acceptability of the lost-motion technology such that it will help make possible more advanced combustion modes such as HCCI (homogenous charge compression ignition).

DETAILED DESCRIPTION OF THE INVENTION

Figure 1:
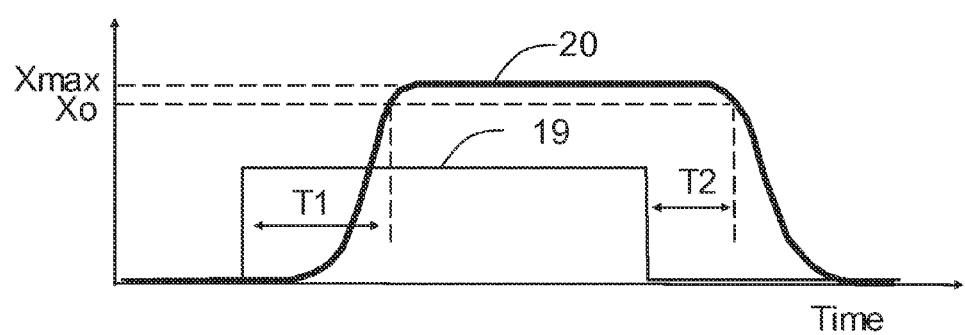
FIG. 1 is an illustration of the behavior of a solenoid valve used in prior art lost-motion systems.
Figure 2:
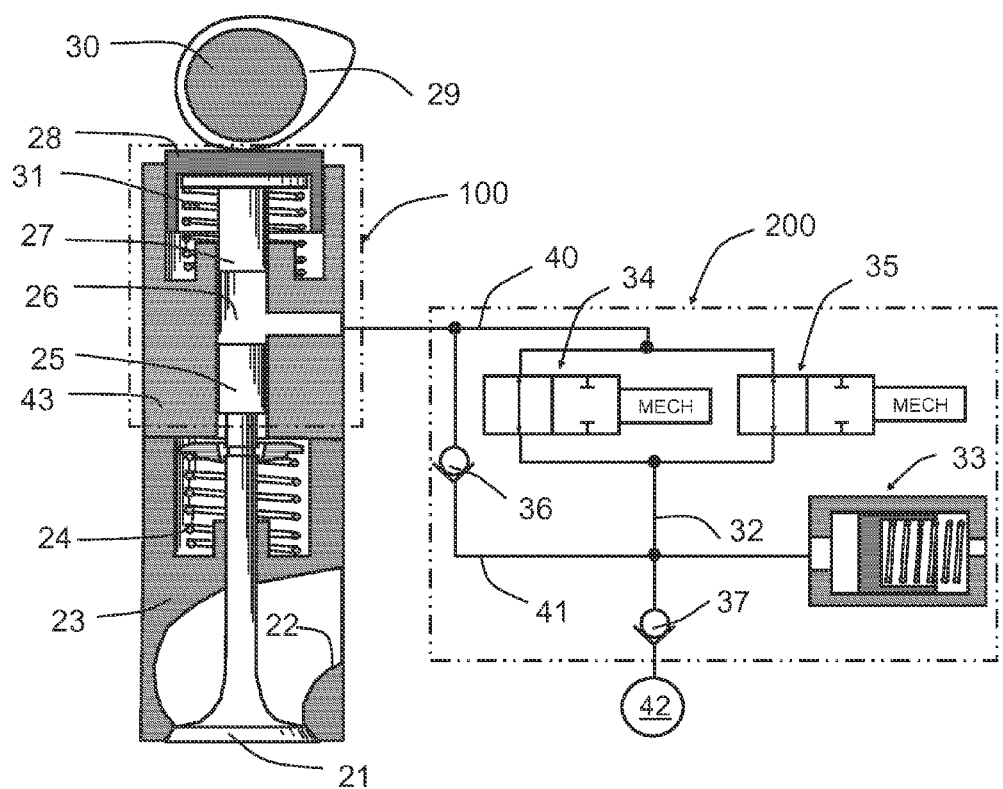
FIG. 2 is a schematic illustration of an embodiment of a lost-motion valve actuation system of this invention.

Please refer to FIG. 2, a preferred embodiment of the present invention FIG. It includes an engine valve 21, which could be an intake valve or an exhaust valve, and a corresponding (intake or exhaust) duct 22 situated in a cylinder head 23 of an internal combustion engine. The engine valve 21 is returned to its closing position (upwardly, with reference to FIG. 2) by a engine-valve return spring 24, while it is driven to open by a slave piston 25 butting against the top of the valve stem. The slave piston 25 is in turn driven, via oil in the high pressure chamber 26 situated in an actuator housing 43, by a master piston 27 under a mechanical tappet 28 operably connected with a cam 29 of a camshaft 30. The mechanical tappet 28 is held against the cam 29, with help from a tappet spring 31.

The high pressure chamber 26 is connected in serial with a passage two 40, parallelly arranged trigger valve one 34 and trigger valve two 35, and a passage one 32. The passage one 32 is further connected with an accumulator 33 and an oil supplier 42 (through an optional supply check valve 37). The oil supply 42 may be the engine lubrication circuit. The passage two 40 may be a part of the high pressure chamber 26. The trigger valve one 34 and trigger valve two 35 are each controlled mechanically, instead of being controlled by solenoid as in prior art. One of the design options for the accumulator 33 is a spring-loaded type as illustrated in FIG. 2.

When at least one of the trigger valves 34 and 35 is opened, the oil is discharged from the high pressure chamber 26, so that the engine valve 21 is rapidly closed under the action of the engine-valve return spring 24. This operation state is also called the de-activated or collapsed state since the movements of the mechanical tappet 28 and of the master piston 27 do not cause corresponding movements of the slave piston 25 for controlling the engine valve 21. The discharged oil can be stored in the accumulator 33 to help rapidly recharge the high pressure chamber 26 when needed later.

When both trigger valves 34 and 35 are closed, the oil trapped in the high pressure chamber 26 transmits the movements of the master piston 27 to the slave piston 25 and further to the engine valve 21, and thus the cam 29 normally actuates the opening of the engine valve 21 according to the cam profile. However, this normal motion transfer can be disrupted, when desired, by opening at least one of the trigger valves 34 and 35, so as to break up the connection between the master piston 27 and the engine valve 21.

This embodiment may have an optional supplemental passage 41 and a corresponding supplemental check valve 36 to connect the passage one 32 with the high pressure chamber 26, to help charge the high pressure chamber 26 even when the trigger valves 34 and 35 are closed. Because of its one-directional nature, the check valve 36 does not allow the oil to discharge from the high pressure chamber 26 through the supplemental passage 41.

As indicated in FIG. 2, the following elements can be grouped together as a hydraulic circuit 200: the trigger valves 34 and 35, the passage one 32, the passage two 40, supply check valve 37, the supplemental passage 41, the supplemental check valve 36, and the high pressure chamber 26. The hydraulic circuit 200 as a group is directly responsible for the state of the high pressure chamber 26. The following elements can be grouped together as an lost-motion module 100: the collapsible high-pressure chamber 26 (i.e., the source of the lost-motion), the master piston 27, the slave piston 25, the mechanical tappet 28, and the tappet spring 31. The lost-motion module 100 converts, under the control of the hydraulic circuit 200, the motion from the cam 29 to the engine valve 21.

The embodiment illustrated in FIG. 2 may be also applied in many other engine applications with different valve-train design, with some adaptation of the lost-motion module. For example: the mechanical tappet 28, for example, may be replaced with a rocker (not shown in FIG. 2) to transfer the motion between the cam 29 and the master piston 27.

A valve bridge (not shown in FIG. 2) may be added between the slave piston 25 and the valve stems of two engine valves so that one high-pressure chamber 26 and one slave piston 25 may be used to control two engine valves.

Figure 17:
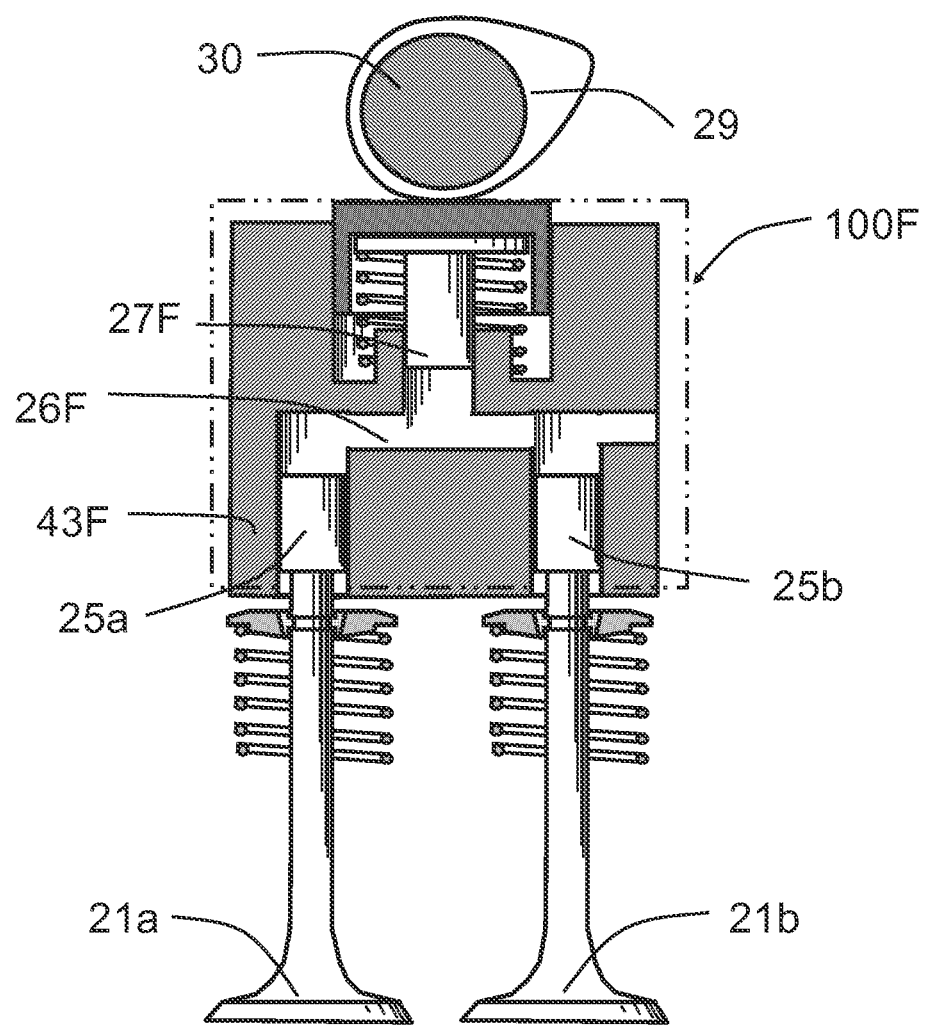
FIG. 17 is an illustration of the application of the present invention to actuate two engine valves using one high-pressure chamber.

Another way to drive two engine valves is to include a second slave piston 25b, which is in turn operably connected to and drives the second engine valve 21b (shown in FIG. 17). A further variation is to incorporate these two slave pistons into a valve bridge to drive two engine valves.

In some engine application, one high-pressure chamber 26 may be situated between a valve rocker arm and a valve push rod or push tube (not shown in FIG. 2) with the master piston 27 operably connected with the push rod and the slave piston 25 operably connected with one end of the rocker arm.

Figure 3:
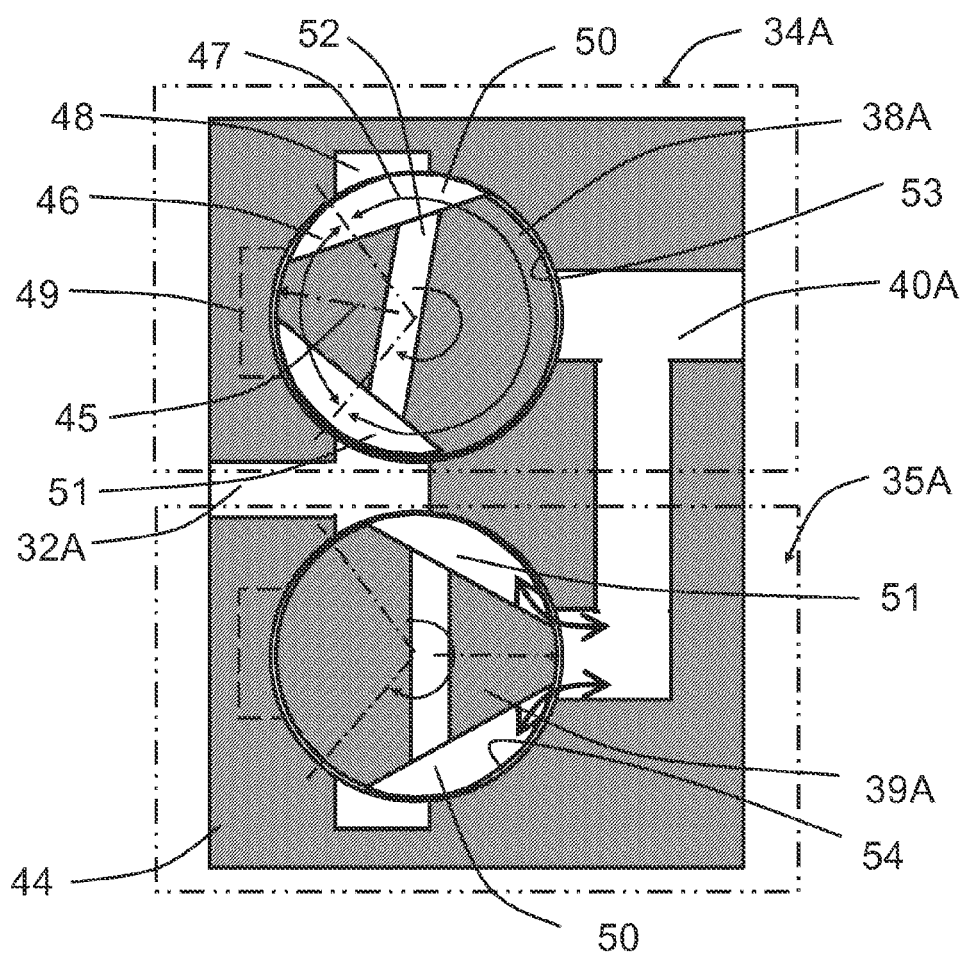
FIG. 3 is a schematic illustration of an embodiment of a pair of rotary trigger valves of this invention.

FIG. 3 is a schematic illustration of one embodiment of the trigger valve one 34A and trigger valve two 35A. They are two two-way rotary hydraulic valves, situated within a combined valve housing 44. These two valves may be designed identically as shown in FIG. 3, but not necessarily so.

The trigger valve one 34A includes a valve cavity one 53 situated in the valve housing 44, a control shaft one 38A situated inside the valve cavity one 53, a flow channel one 50 and a flow channel two 51 cut out of two sides of the control shaft one 38A, a cross channel 52 through the control shaft one 38A to connect two flow channels 50 and 51, a or a part of passage two 40A in the valve housing 44 and exposed to part of the cavity one 53, a or a part of passage one 32A in the valve housing 44 and exposed to part of the cavity one 53, a passage-one balance undercut 48 along a segment of the wall of the cavity one 53 to balance the pressure force from the passage one 32A, and at least one passage-two balance undercut 49 along a segment of the wall of the cavity one 53 to balance the pressure force from the passage two 40A. The valve cavity one 53 has at least one opening to the passage one 32A and at least one opening to the passage two 40A.

The passage-two balance undercut 49 is in fluid communication with the passage two 40A via a fluid connection, not shown in FIG. 3, through the valve housing 44. Fluid pressure force balance is necessary because of fluid pressure differential between the passage one 32A and the passage two 40A, especially when the rotary valves are closed. Along the axis of the control shaft one 38A, the passage-two balance undercut 49 is situated at a location where it does not intercept the flow channels 50 and 51. To have a better balance, there need to be two passage-two balance undercuts 49 at two axial sides of the flow channels 50 and 51.

An artificial or imaginary rotational position marker 45, which rotates with the control shaft one 38, is included in FIG. 3 to help identify rotational position of the control shaft. The details of the valve design is such that the trigger valve one 34A is open and closed when the rotational position marker 45 is within a open region 47 and a closed region 46, respectively. Two regions 46 and 47 add up to the full circle or 360 degrees. Here, the word open also includes partially open when the rigger valve one 34A is not able to completely (or substantially, considering potential leakage flow through the clearance between the control shaft and cavity and other leakage path) isolate the high pressure chamber 26. A practical demarcation between the open and closed states and flow characteristics around the demarcation need to be engineered, tested, analyzed and calibrated.

The above descriptions about the trigger valve one 34A also generally applies to the trigger valve two 35A. In FIG. 3, the trigger valve one 34A and trigger valve two 35A happen to be in the closed and open states, respectively.

In FIG. 3, the closed region 46 is roughly ⅓ of the full circle, corresponding to 240 crank angle degrees, within two engine revolutions, being available for locking up the high pressure chamber 26 for engine valve actuation. One is certainly free to design differently per functional requirements. Both control shaft one 38A and control shaft two 39A in FIG. 3 rotate, similar to a camshaft, one revolution for every two crank shaft revolutions.

Figure 4:
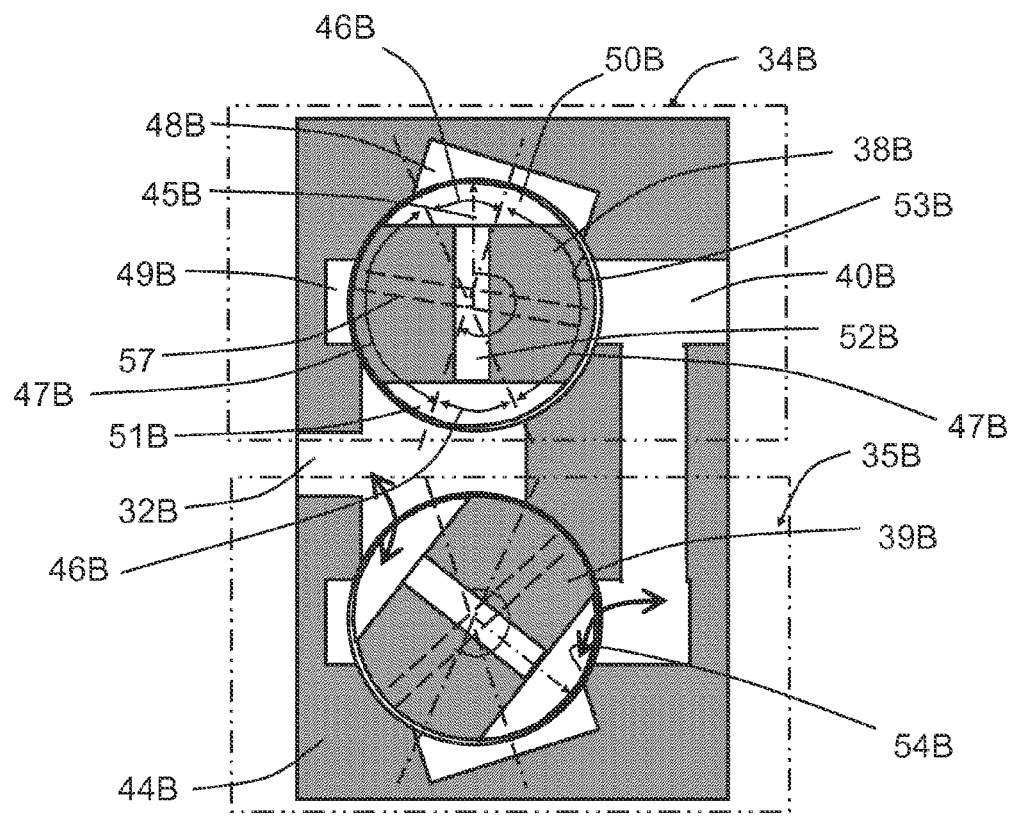
FIG. 4 is a schematic illustration of another embodiment of a pair of rotary trigger valves of this invention.

As shown in FIG. 4, it is also possible to design the trigger valves in a way that the control shafts rotate one revolution for every four crank shaft revolution or for two thermal cycles, by including two on/off cycles within one rotation. The trigger valve one 34B and trigger valve two 35B are situated within a combined valve housing 44B. These two valves may be designed identically as shown in FIG. 4, but not necessarily so.

The trigger valve one 34B includes a valve cavity one 53B situated in the valve housing 44B, a control shaft one 38B situated inside the valve cavity one 53B, a flow channel one 50B and a flow channel two 51B cut out of two sides of the control shaft one 38B, a cross channel 52B through the control shaft one 38B to connect two flow channels 50B and 51B, a or apart of passage two 40B in the valve housing 44B and exposed to part of the cavity one 53B, a or a part of passage one 32B in the valve housing 44B and exposed to part of the cavity one 53B, a passage-one balance undercut 48B along a segment of the wall of the cavity one 53B to balance the pressure force from the passage one 32B, and a passage-two balance undercut 49B along a segment of the wall of the cavity one 53B to balance the pressure force from the passage two 40B. The passage-two balance undercut 49B is in fluid communication with the passage two 40B via a balance connection 57 passing through the control shaft one 38B. Along the axis of the control shaft one 38B, the passage-two balance undercut 49B is situated at a location where it does intercept the flow channels 50B and 51B, and the balance connection 57 is situated at a location where it does not intercept the cross channel 52B.

An artificial or imaginary rotational position marker 45B, which rotates with the control shaft one 38B, is included in FIG. 4 to help identify rotational position of the control shaft. The details of the valve design is such that the trigger valve one 34B is open twice and closed twice when the rotational position marker 45B is within two open regions 47B and two closed regions 46B, respectively. All four regions add up to the full circle or 360 degrees.

The above descriptions about the trigger valve one 34B also generally applies to the trigger valve two 35B. In FIG. 43, the trigger valve one 34B and trigger valve two 35B happen to be in the closed and open states, respectively. Both control shaft one 38B and control shaft two 39B in FIG. 4 rotate, different from a normal camshaft, one revolution for every four crank shaft revolutions.

Figure 5:
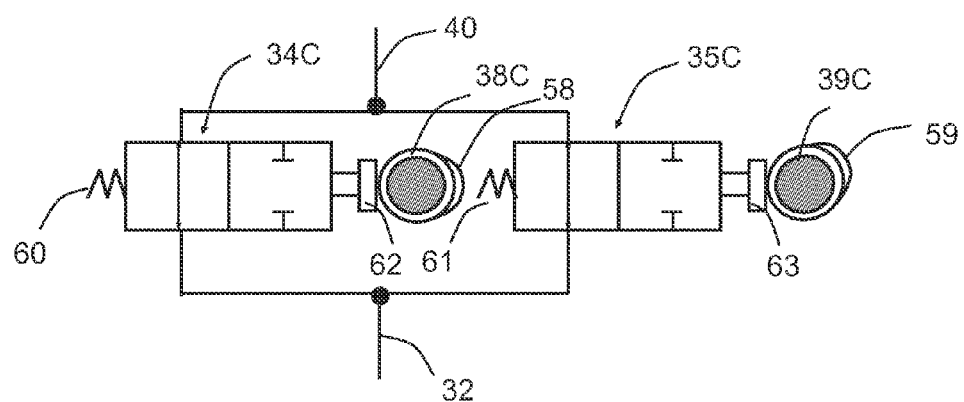
FIG. 5 is a schematic illustration of an embodiment of a pair of linear trigger valves of this invention.

FIG. 5 is a schematic illustration of another embodiment of the trigger valve one 34C and trigger valve two 35C. The trigger valve one 34*c* is a linear valve with a poppet or slide spool (the details of which is not shown in FIG. 5) which is normally open under the force of a reset spring one 60 and is driven to close by one of control lobe 58 on a control shaft one 38C. The trigger valve one 34*c* may also include an optionally trigger tappet one 62 to help reduce sliding frictional force from the cam.

Similarly, the trigger valve two 35*c* is a linear valve with a poppet or slide spool (the details of which is not shown in FIG. 5) which is normally open under the force of a reset spring one 61 and is driven to close by one of control lobe 59 on a control shaft two 39C. The trigger valve one 35*c* may also include an optionally trigger tappet two 63 to help reduce sliding frictional force from the cam.

Figure 6:
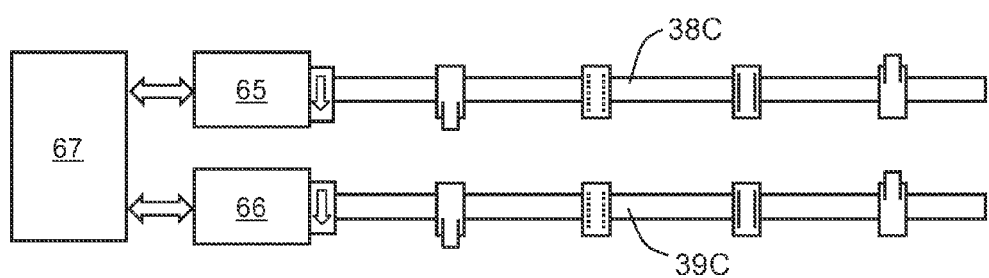
FIG. 6 is a schematic illustration of how the control shafts are actuated and controlled.

FIG. 6 is a schematic illustration of how the control shaft one 38C and control shaft two 39C, in the form of cam shafts in this case, may be further actuated and controlled. The control shaft one 38C and control shaft two 39C are actuated respectively by a rotary actuator one 65 and a rotary actuator two 66, which are further controlled by an electronic control unit 67. The two rotary actuators may rotate in the same direction (as indicated in FIG. 6) or otherwise, depending on the need of the trigger valve design or arrangement. Each rotary actuator includes some rotational position sensor or encode (not shown). The electronic control unit 67 and the rotary actuators 65 and 66 exchange necessary feedback and control signals and driving voltage or current. The rotary actuators 65 and 66 are preferred to be electrical motors, able to achieve adequate accuracy and time response over a wide range of temperatures, especially at low temperatures, and over a long engine or vehicle life. This is consistent with a current practice of replacing electrohydraulic variable valve timing systems with newly developed electrical variable valve timing systems. Each shaft shall have enough cams to cover all trigger valves along a cylinder head. In FIG. 6, each of the shafts is able to drive at least one trigger valve at each cylinder of a four-cylinder engine.

The control shafts for the rotary type of trigger valves may be also actuated and controlled as shown in FIG. 6.

The moving elements of the trigger valves should be much lighter in mass and under a much lower load than an engine valve, and the load on the rotary actuators 65 and 66 should therefore be much lower than that of a typical cam phaser (i.e., phasing device). It is also possible to combine two rotary actuators 65 and 66 into an integrated actuator (not shown), when it is also possible to arrange two cam shafts in a concentric form (not shown) to help packaging.

For a linear trigger valve disclosed in FIG. 5, the full displacement of its poppet or spool is typically an order of magnitude smaller than the lift of an engine valve, and the cam lobes on the shafts 38C and 39C are therefore not prominent. It is feasible to design, for individual cams locally, a small base diameter and a low lobe height so that a whole cam shaft may slide through full bearings or bushings for manufacturing accuracy and easy assembly.

FIGS. 7-11 illustrate how two mechanically controlled trigger valves achieve typical engine lilt profiles in a lost-motion system.

Figure 7:
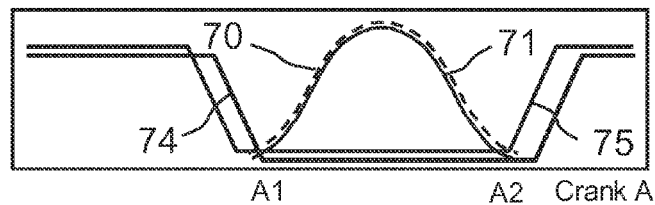
FIG. 7 is an illustration of how two trigger valves of this invention achieve full load operation.

FIG. 7 illustrates the full load operation, i.e. the actual engine valve lift 71 follows what the base cam lobe profile 70, which is achieved only when there is no discharge of the oil from the high pressure chamber, i.e., no lost-motion. Therefore, both trigger valves have to be effectively closed, i.e., the trigger-valve-one open area 74 and the trigger-valve-two open area 75 being zero, over a crank angle window between the start crank angle A1 and the end crank angle A2. Here the term open area means the opening area of the valve metering port. The open area curves do not touch the bottom in FIG. 7-14 for easier identification. Also, their transition or slope between the open and closed state is artificially straight or linear, and the actual transition will depend on the shape of the metering port.

Unlike a traditional lost-motion system with solenoid valves as control valves, each mechanically controlled trigger valve in this disclosure has a fixed window of the closed state. The size of this fixed window at least has to be wider than the A1-A2 window in FIG. 7. For other engine valve operations in FIGS. 8-11, the trigger-valve-one open area 74 and the trigger-valve-two open area 75 are purposely shifted to define the start crank angle A1 and the end crank angle A2, respectively, with both open areas 74 and 75 being zero in between A1 and A2.

Figure 8:
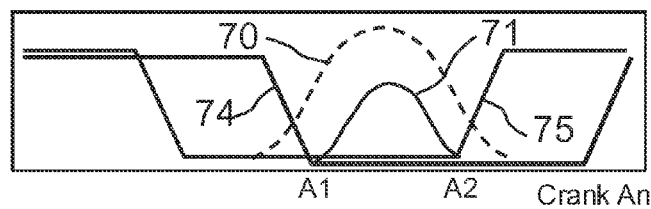
FIG. 8 is an illustration of how two trigger valves of this invention achieve late valve open operation.

FIG. 8 illustrates late valve open operation. The trigger valve one 34 (with its corresponding open area 74) is not initially closed until the start crank angle A1, from which point the actual engine valve lift 71 starts following the base cam lobe profile 70. However, the lost-motion (i.e., the lift differential between curves 70 and 71 measured at the start crank angle A1) stays with the actual engine valve lift 71, causing a premature bottom-out at the end crank angle A2 as long as the trigger valve two 35 (with its corresponding open area 75) does not open up before A2. This valve operation mode is mostly used for intake valve low-speed and low-torque engine operation, such as engine idle, to achieve optimized combustion and efficiency.

Figure 9:
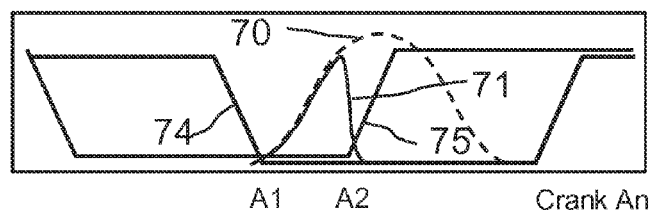
FIG. 9 is an illustration of how two trigger valves of this invention achieve one early valve close operation.

FIG. 9 illustrates one early valve close operation. The actual engine valve lift 71 has a full start at the start crank angle A1 and follows the base cam lobe profile 70 with high fidelity until the end crank angle A2, before the lift 71 reaches the peak of the base cam lobe profile, the trigger valve two 35 (with its corresponding open area 75) opens up, discharging the high pressure chamber to cause a rapid drop in the actual engine valve lift 71. This valve operation mode is mostly used for intake valve low-speed and high-torque engine operation, such as initial vehicle acceleration, to achieve maximum torque and maximum volumetric efficiency.

Figure 10:
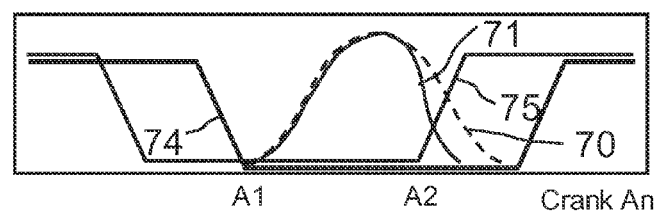
FIG. 10 is an illustration of how two trigger valves of this invention achieve another early valve close operation.

FIG. 10 illustrates another early valve close operation. The actual engine valve lift 71 has a full start at the start crank angle A1 and follows the base cam lobe profile 70 with high fidelity until the end crank angle A2, after the lift 71 passes the peak of the base cam lobe profile, when the trigger valve two 35 (with its corresponding open area 75) opens up, discharging the high pressure chamber to cause a rapid drop in the actual engine valve lift 71. This valve operation mode is mostly used for intake valve middle-speed and high-torque engine operation, such as middle-speed vehicle acceleration, to achieve maximum torque and maximum volumetric efficiency.

Figure 11:
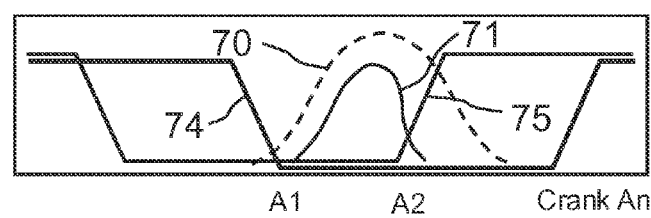
FIG. 11 is an illustration of how two trigger valves of this invention achieve a combination operation of late valve open and early valve close.

FIG. 11 illustrates a combination operation of late valve open and early valve close. The trigger valve one 34 (with its corresponding open area 74) is not initially closed until the start crank angle A1, from which point the actual engine valve lift 71 starts following the base cam lobe profile 70. However, the lost-motion (i.e., the lift differential between curves 70 and 71 measured at the start crank angle A1) stays with the actual engine valve lift 71 until the end crank angle A2 when the trigger valve two 35 (with its corresponding open area 75) opens up, discharging the high pressure chamber to cause a rapid drop in the actual engine valve lift 71. This valve operation mode is mostly used for intake valve middle-speed and middle-torque engine operation, such as some city driving and some cruising, to achieve efficient combustion.

Figure 12:
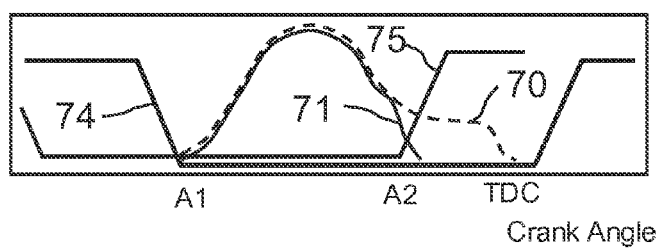
FIG. 12 is an illustration of applicability of the present invention to a combustion mode called "outgoing air control."

FIG. 12 illustrates applicability of the present invention to a combustion mode called "outgoing air control," as articulated in US Patent Publication 20110214632A1, which calls for much later intake valve closing to reduce pumping loss and lower air temperature. This operation mode is also called Miller cycle. The base cam lobe profile 70 has therefore a low-lift extension all the way to the top dead center (TDC). The zero open-area window of each of the two trigger valves has to be at least as wide as the A1-TDC window in FIG. 12 so that the system is able to operate a full "outgoing air control" operation. In the operation illustrated in FIG. 12, however, the actual engine valve lift 71 looks like a normal full lift profile illustrated in FIG. 7, by opening up the trigger valve two 35 (with its corresponding open area 75) at crank angle A2, much earlier than TDC, triggering a lost-motion action to cut off that low-lift extension and to perform a normal or so-called "ingoing air control" operation.

Figure 13:
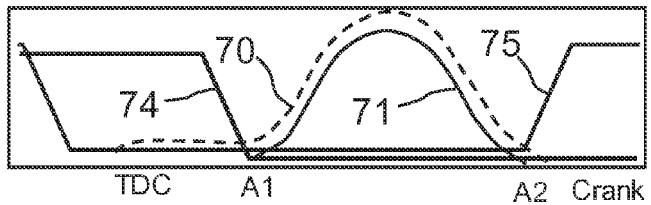
FIG. 13 is an illustration of a normal operation mode of a compression-release brake capable system.
Figure 14:
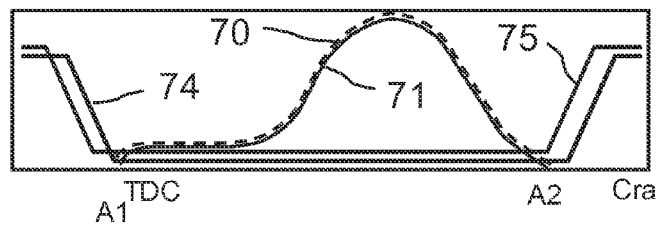
FIG. 14 is an illustration of the compression-release brake operation mode of a compression-release brake capable system.

FIGS. 13 and 14 illustrate applicability of the present invention to exhaust valves capable of the compression-release brake function, which is typically used in large diesel engines installed in heavy commercial trucks for safe operation, especially on a long slope. The compression-release brake refers to an engine or vehicle brake method that selectively open exhaust valves near the top dead center (TDC) to release or waste compression energy, thus achieving brake function. To attain this compression-release brake, the base cam lobe profile 70 in FIGS. 13 and 14 has a low-lift (typically a few millimeters) extension, to the left, all the way over the top dead center TDC. The zero open-area window of each of the two trigger valves may be as wide as the base cam lobe profile 70.

FIG. 13 specifically illustrates a normal or non-brake operation mode. The trigger valve one 34 (with its corresponding open area 74) is not initially closed until the start crank angle A1, bypassing the low-lift extension used for brake. From start crank angle A1, the actual engine valve lift 71 starts following the base cam lobe profile 70, minus a lost-motion (i.e., the lift differential between curves 70 and 71 measured at the start crank angle A1, which is typically around a few millimeters) until it bottoms out or seats at the end crank angle A2. This is a mostly used operation mode for a diesel engine. The lift profile 71 is therefore the real base profile, and the design of the base cam lobe profile 70 has to be based the profile 71, adding the height of the low-lift extension and consideration for oil leakage along the way.

FIG. 14 specifically illustrates the compression-release brake operation mode. In this case, the actual engine valve lift 71 follows the entire base cam lobe profile 70, without any intentional discharge of the oil from the high pressure chamber 26. It is conceivable though to close the exhaust valve a little earlier than the crank angle A2 in FIG. 13, where bulk of the compressed air in the engine cylinder should have been exhausted already, without losing too much brake efficiency.

Figure 15:
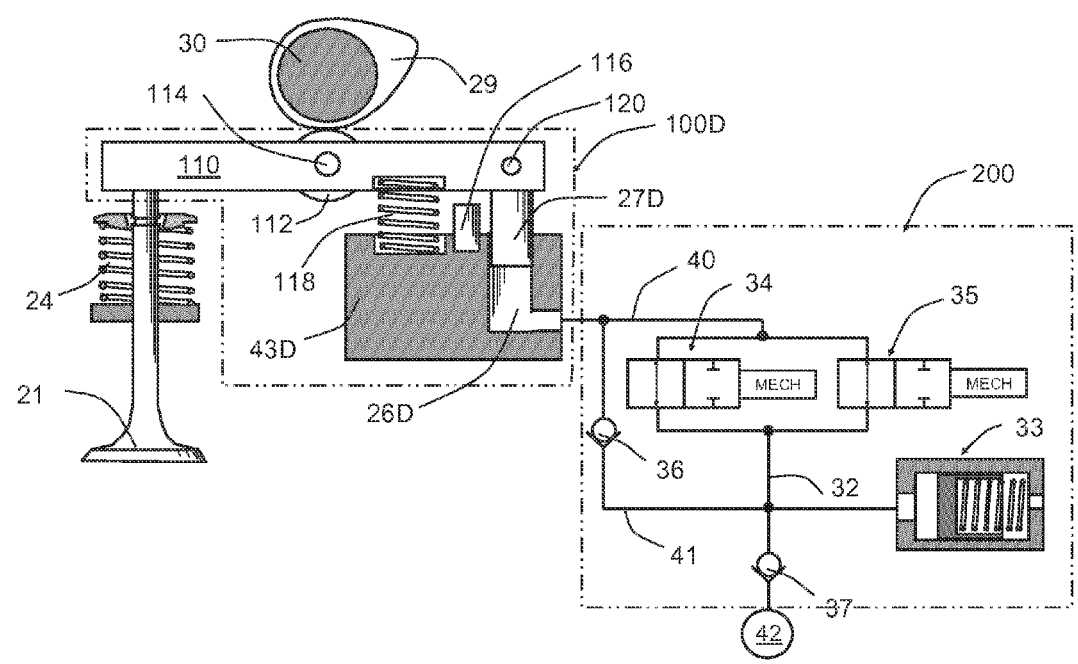
FIG. 15 is an illustration of the application of the present invention to a finger-follower valve-train.
Figure 16:
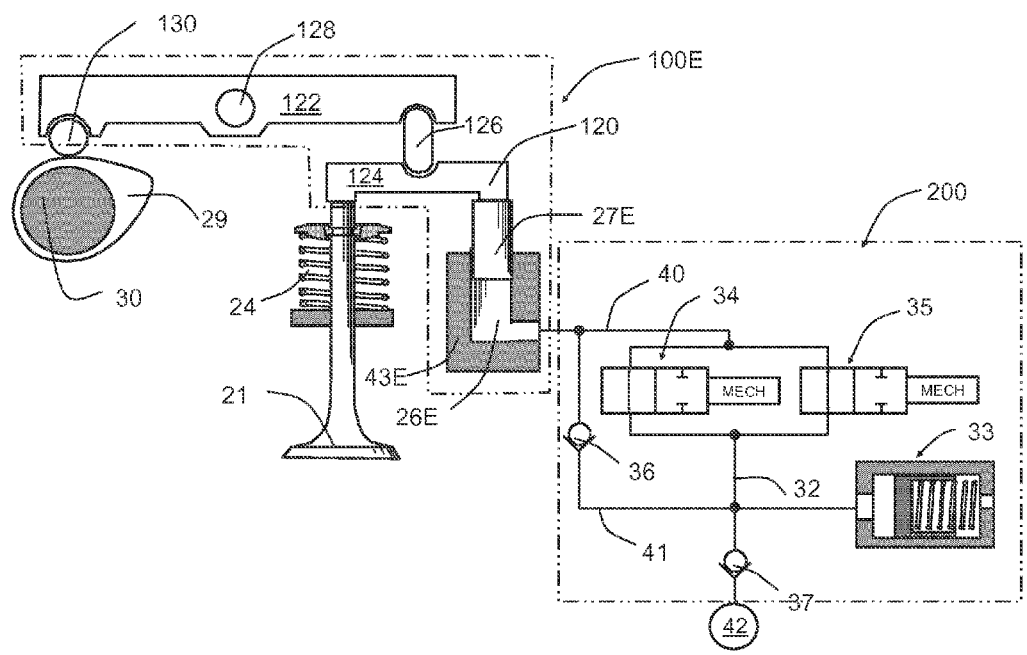
FIG. 16 is an illustration of the application of the present invention to a rocker arm valve-train.

FIGS. 15 and 16 illustrate another way to apply the lost-motion mechanism. Mainly, the high pressure chamber 5 is not in serial with the motion mechanism. The motion mechanism is defined in this specification as part of the valve-train which is directly involved in the transfer a motion from a cam to an engine valve. Therefore the lost-motion is rendered as an adjustment to a pivot point, and the related piston in the high-pressure chamber is called an adjustable piston. There is no slave piston involved because the lost-motion is not linearly transferred or rendered.

In FIG. 15, the motion mechanism is a finger-follower valve-train or mechanism. The finger-follower valve-train is widely used in engine application. The lost-motion module 1001) comprises a pivoting bridge 110, with one end being operably connected with an engine valve 21; a pin 120, operably joining the other end of the pivoting bridge 110 with an adjustable piston 27D; and a cam roller 112, operably assembled at a central point 114 of the pivoting bridge 110 to provide a low-friction contact with the cam 29. In a conventional valve-train, the adjustable piston 27D is a fixed support point for the pivoting bridge 110. In this embodiment shown in FIG. 15, when the high-pressure chamber 26D collapses under the control of the hydraulic circuit 200, the adjustable piston 27D sinks down and the pivoting bridge 110 loses its geometric leverage in moving the engine valve even when the cam 29 is exerting the peak of its lobe at the cam roller 112, thus the engine valve 21 loses its motion or motion potential.

The lost-motion module 100D optionally further comprises an initial start mechanism 116 for easier engine cold start and a bias spring 118 to help the adjustable piston 27D in its recovery to a fully extended position after a collapsing event of the high-pressure chamber 26D.

In FIG. 16, the motion mechanism is a rocker arm mechanism. The lost-motion module 100E comprises an axle 128; a rocker arm 122, with its center rotably mounted on the axle 128; a cam roller 130, operably situated between one end of the rocker arm 122 and the cams 29 for friction reduction; a pivot bridge 124, with one end operably connected with the engine valve 21 and the other end operably connected to the adjustable piston 27E; and a level pushrod 126, operably connect the other end of the rocker arm 122 and a central point of the pivot bridge 124.

In this embodiment shown in FIG. 16, when the high-pressure chamber 26E collapses under the control of the hydraulic circuit 200, the adjustable piston 27E sinks down and the pivoting bridge 124 loses its geometric leverage in moving the engine valve even when the cam 29 is exerting the peak of its lobe at the cam roller 130, thus the engine valve 21 loses its motion or motion potential.

I claim:

1. An engine valve actuation system comprising:
   a) a camshaft, with at least one cam;
   b) a control shaft one;
   c) a control shaft two; and
   d) at least one valve actuation unit, each valve actuation unit further comprising:
      (i) at least one set of an engine valve and an engine-valve return spring;
      (ii) a lost-motion module, the lost-motion module further comprising a collapsible high-pressure chamber, and operably converting the profile of the at least one cam and the collapsing motion from the high-pressure chamber to corresponding movement of the at least one engine valve; and
      (iii) a hydraulic circuit, the hydraulic circuit further comprising:
         a passage two, in fluid communication with the high-pressure chamber;
         a passage one, in fluid communication with an oil supply;
         a trigger valve one and a trigger valve two, parallelly arranged, each trim valve being a two-way valve, each trigger valve being connected between the passage one and the passage two and thereby controlling fluid communication between the passage one and the passage two, and the trigger valve one and the trigger valve two being controlled respectively by the control shaft one and the control shaft two; and
         an accumulator, in fluid communication with the passage one.

2. The engine valve actuation system of claim 1, wherein the lost-motion module further comprises
   a master piston, slidably situated in one end of the high-pressure chamber and operably in connection with the at least one cam; and
   at least one slave piston, slidably situated in another end of the high-pressure chamber and operably in connection with the at least one engine valve.

3. The engine valve actuation system of claim 2, wherein the lost-motion module further comprises
   a mechanical tappet, the mechanical tappet situated in between the at least one cam and the master piston.

4. The engine valve actuation system of claim 3, wherein the lost-motion module further comprises
   a tappet spring, the tappet spring helping hold the mechanical tappet against the at least one cam.

5. The engine valve actuation system of claim 2, wherein the at least one slave piston comprises two slave pistons;
   the at least one set of an engine valve and an engine-valve return, spring comprises two engine valves and two corresponding engine-valve return springs; and
   each of the two slave pistons is operably connected with one of the two engine valves.

6. The engine valve actuation system of claim 1, wherein the hydraulic circuit further comprises
   a supply check valve, the supply check valve situated along the passage one, thereby allowing one-way flow from the oil supply.

7. The engine valve actuation system of claim 1, wherein the hydraulic circuit further comprises:
   a supplemental passage, the supplemental passage connecting the passage one and the high-pressure chamber; and
   a supplemental check valve, the supplemental check valve situated in the supplemental passage, thereby allowing one-way flow to the high-pressure chamber.

8. The engine valve actuation system of claim 1, wherein each of the trigger valve one and the trigger valve two is of a rotary design.

9. The engine valve actuation system of claim 8, wherein the trigger valve one comprises a valve cavity one, with at least one opening to the passage one and at least one opening to the passage two, and accommodating inside the control shaft one; and
   the trigger valve two comprises a valve cavity two, with at least one opening to the passage one and at least one opening to the passage two, and accommodating inside the control shaft two.

10. The engine valve actuation system of claim 9, wherein
(a) the trigger valve one further comprises
   at least one passage-one balance undercut on the wall of the valve cavity one; and
   at least two flow channels fabricated on the control shaft one;
   thereby opening once and closing once fluid communication between the passage one and the passage two per revolution by the control shaft one; and
(b) the trigger valve two further comprises
   at least one passage-one balance undercut on the wall of the valve cavity two;
   at least two flow channels fabricated on the control shaft two; and
   thereby opening once and closing once fluid communication between the passage one and the passage two per revolution by the control shaft two.

11. The engine valve actuation system of claim 9, wherein
(a) the trigger valve one further comprises
   at least one passage-one balance undercut and at least one passage-two balance undercut on the wall of the valve cavity one; and
   at least two flow channels fabricated on the control shaft one;
   thereby opening twice and closing twice fluid communication between the passage one and the passage two per revolution by the control shaft one; and
(b) the trigger valve two further comprises
   at least one passage-one balance undercut and at least one passage-two balance undercut on the wall of the valve cavity two; and
   at least two flow channels fabricated on the control shaft two;
   thereby opening twice and closing twice fluid communication between the passage one and the passage two per revolution by the control shaft two.

12. The engine valve actuation system of claim 1, wherein
each of the trigger valve one and the trigger valve two is of a linear design;
the control shaft one comprises a plurality of control lobes; and
the control shaft two comprises a plurality of control lobes.

13. The engine valve actuation system of claim 1, wherein
each of the trigger valve one and the trigger valve two comprises a reset spring, the reset spring thereby resetting open the fluid communication;
the trigger valve one is forced to close when actuated by one of the control lobes on the control shaft one; and
the trigger valve two is forced to close when actuated by one of the control lobes on the control shaft two.

14. The engine valve actuation system of claim 1, wherein the lost-motion module further comprises:
   an adjustable piston, the adjustable piston slidably situated in one end of the high-pressure chamber; and
   a motion mechanism, the motion mechanism operably connecting the adjustable piston with the at least one engine valve, whereby reducing the opening motion of the at least one engine valve when the oil in the high-pressure chamber is discharged.

15. The engine valve actuation system of claim 14, wherein the motion mechanism is a finger-follower valve-train, comprising
   a pivoting bridge, with one end being operably connected with at least one engine valve;
   a pin, the pin operably joining the other end of the pivoting bridge with the adjustable piston;
   a cam roller, the cam roller operably assembled at a central point of the pivoting bridge.

16. The engine valve actuation system of claim 14, wherein the motion mechanism is a rocker arm mechanism.

17. The engine valve actuation system of claim 16, wherein the rocker arm mechanism comprises:
   an axle;
   a rocker arm, with a center of the rocker arm ratably mounted on the axle;
   a cam roller, operably situated between one end of the rocker arm and the one of the cams;
   a pivot bridge, with one end of the pivot bridge being operably connected with at least one engine valve, and the other end of the pivot bridge being operably connected to the adjustable piston; and
   a level pushrod, operably connect the other end of the rocker arm and a central point of the pivot bridge.

* * * * *